United States Patent
Waplington et al.

(10) Patent No.: US 11,706,245 B2
(45) Date of Patent: Jul. 18, 2023

(54) SYSTEM AND METHOD FOR SOLUTION RESOLUTION FOR VULNERABILITIES IDENTIFIED BY THIRD-PARTY VULNERABILITY SCANNERS

(71) Applicant: ServiceNow, Inc., Santa Clara, CA (US)

(72) Inventors: Brian James Waplington, San Diego, CA (US); Hemendra Rana, Saratoga, CA (US); Naveen Reddy Bojja, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/815,770

(22) Filed: Jul. 28, 2022

(65) Prior Publication Data
US 2022/0368715 A1 Nov. 17, 2022

Related U.S. Application Data

(63) Continuation of application No. 16/813,348, filed on Mar. 9, 2020, now Pat. No. 11,489,861.
(Continued)

(51) Int. Cl.
*H04L 9/40* (2022.01)
*G06F 16/22* (2019.01)
(Continued)

(52) U.S. Cl.
CPC ...... *H04L 63/1433* (2013.01); *G06F 16/2282* (2019.01); *G06F 16/2379* (2019.01); *G06N 5/04* (2013.01); *G06N 20/00* (2019.01)

(58) Field of Classification Search
CPC . G06Q 10/0635; G06Q 10/0637; G06F 16/22
(Continued)

(56) References Cited

U.S. PATENT DOCUMENTS 5,978,594 A 11/1999 Bonnell et al.
6,321,229 B1 11/2001 Goldman et al.
(Continued)

OTHER PUBLICATIONS

U.S. Appl. No. 62/864,370, filed Jun. 20, 2019, Waplington et al.
(Continued)

*Primary Examiner* — Hung T Vy
(74) *Attorney, Agent, or Firm* — Fletcher Yoder PC

(57) ABSTRACT

A vulnerability-solution resolution (VSR) system is disclosed that is designed to create and maintain associations between vulnerabilities identified by third-party scanners (TPSs) and solutions, such as software patches received from third-party vendors. The VSR system includes a data scheme that enables information regarding vulnerabilities and solutions to be stored, and enables certain relationships to be automatically created between these vulnerabilities and solutions. In particular, the VSR system is designed to automatically form certain relationships between particular vulnerabilities and solutions based on solution supersedence and inheritance. Additionally, the VSR system includes a graphical user interface (GUI) that enables a user to exclude particular relationships from consideration when recommending solutions to resolve a vulnerability or when calculating metrics regarding the vulnerability.

20 Claims, 17 Drawing Sheets

Related U.S. Application Data

(60) Provisional application No. 62/935,571, filed on Nov. 14, 2019.

(51) Int. Cl.
   *G06N 5/04* (2023.01)
   *G06N 20/00* (2019.01)
   *G06F 16/23* (2019.01)

(58) Field of Classification Search
   USPC .............................................. 707/609; 726/25
   See application file for complete search history.

(56) References Cited

U.S. PATENT DOCUMENTS

| | | |
|---|---|---|
| 6,799,189 B2 | 9/2004 | Huxoll |
| 6,816,898 B1 | 11/2004 | Scarpelli et al. |
| 6,895,586 B1 | 5/2005 | Brasher et al. |
| 7,027,411 B1 | 4/2006 | Pulsipher et al. |
| 7,392,300 B2 | 6/2008 | Anantharangachar et al. |
| 7,617,073 B2 | 11/2009 | Trinon et al. |
| 7,685,167 B2 | 3/2010 | Mueller |
| 7,877,783 B1 | 1/2011 | Cline et al. |
| 7,933,927 B2 | 4/2011 | Dee et al. |
| 7,941,506 B2 | 5/2011 | Bonal et al. |
| 7,945,860 B2 | 5/2011 | Vambenepe et al. |
| 8,082,222 B2 | 12/2011 | Rangarajan et al. |
| 8,346,752 B2 | 1/2013 | Sirota et al. |
| 8,380,645 B2 | 2/2013 | Kowalski |
| 8,554,750 B2 | 10/2013 | Rangarajan et al. |
| 8,646,093 B2 | 2/2014 | Myers et al. |
| 8,683,032 B2 | 3/2014 | Spinelli et al. |
| 8,745,040 B2 | 6/2014 | Kowalski et al. |
| 8,812,539 B2 | 8/2014 | Milousheff et al. |
| 8,818,994 B2 | 8/2014 | Kowalski et al. |
| 8,907,988 B2 | 12/2014 | Poston et al. |
| 9,015,188 B2 | 4/2015 | Behne |
| 9,037,536 B2 | 5/2015 | Vos et al. |
| 9,137,115 B2 | 9/2015 | Mayfield et al. |
| 9,261,372 B2 | 2/2016 | Cline et al. |
| 9,323,801 B2 | 4/2016 | Morozov et al. |
| 9,412,084 B2 | 8/2016 | Kowalski et al. |
| 9,467,344 B2 | 10/2016 | Gere et al. |
| 9,534,903 B2 | 1/2017 | Cline et al. |
| 9,613,070 B2 | 4/2017 | Kumar et al. |
| 9,631,934 B2 | 4/2017 | Cline et al. |
| 9,659,051 B2 | 5/2017 | Hutchins et al. |
| 9,792,387 B2 | 10/2017 | George et al. |
| 9,852,165 B2 | 12/2017 | Morozov |
| 9,967,162 B2 | 5/2018 | Spinelli et al. |
| 10,002,203 B2 | 6/2018 | George et al. |
| 2006/0206374 A1* | 9/2006 | Asthana ........... G06Q 10/06375 705/7.37 |
| 2012/0116848 A1* | 5/2012 | Gargiulo ........... G06Q 10/0639 705/7.36 |
| 2020/0404013 A1 | 12/2020 | Waplington et al. |
| 2020/0404022 A1 | 12/2020 | Waplington et al. |
| 2020/0404024 A1 | 12/2020 | Waplington et al. |

OTHER PUBLICATIONS

U.S. Appl. No. 62/935,571, filed Nov. 14, 2019, Waplington et al.

\* cited by examiner

FIG. 14A

| | |
|---|---|
| <==R7-Yn1Y4JxNk0FvtUL+sN38zw== | ◇ ☰ ••• UPDATE DELETE |

| | |
|---|---|
| ID | R7-Yn1Y4JxNk0FvtUL+sN38zw== |
| SOURCE | RAPID7 |
| RISK RATING | 5 – NONE |
| RISK SCORE | 0 |
| SEVERITY | 2 – HIGH |
| EXPLOIT EXISTS | YES |
| EXPLOIT ATTACK VECTOR | -NONE- |
| EXPLOIT SKILL LEVEL | -NONE- |
| SUMMARY | Microsoft CVE-2018-0758:Scripting Engine Memory Corruption Vulnerability |
| CATEGORY | Browsers,Microsoft,Microsoft Path,Privil |
| REMEDIATION TYPE | -NONE- |
| CWE ENTRY | |
| PCI | ✓ |
| PCI SEVERITY | |
| DATE PUBLISHED | 2018-01-03 |
| LAST MODIFIED | 2019-08-21 |

350

VULNERABILITY DETAILS | REMEDIATION STATUS

```
COMMON VULNERABILITY SCORING SYSTEM
CVSS v8.0 Severity Metrics
BASE SCORE: 7.5
VECTOR: CVSS:3.0/AV:N/AC:H/PR:N/UI:R/S:U/C:H/I:H/A:H
IMPACT SUBSCORE: 5.87
EXPLOITABILITY SUBSCORE: 1.62
ATTACK VECTOR (AV): NETWORK
ATTACK COMPLEXITY (AC): HIGH
PRIVILEGES REQUIRED (PR): NONE
USER INTERACTION (UI): REQUIRED
SCOPE CHANGE (S): UNCHANGED
CONFIDENTIALITY
INTEGRITY (I): HIGH
AVAILABILITY (A): HIGH CVSS v2.0 Severity and Metrics
BASE SCORE: 7.6
VECTOR: AV:N AC:H AU:N C:C I:C A:C
IMPACT SUBSCORE: 10
EXPLOITABILITY SUBSCORE: 4.93
ACCESS VECTOR (AV): NETWORK
ACCESS COMPLEXITY (AC): HIGH
AUTHENTICATION (AU): NONE
CONFIDENTIALITY (C): COMPLETE
INTEGRITY (I): COMPLETE
AVAILABILITY (A): COMPLETE
```

THREAT
PREFERED SOLUTION | 🔍
REMEDIATION NOTES

UPDATE DELETE

FROM FIG. 14A

| VULNERABLE ITEMS | VULNERABILITY REFERENCES | CVEs(1) | EXPLOITS(1) | VULNERABILITY MALWARE KITS | EXPLOIT FRAMEWORKS | SOLUTIONS(47) |
|---|---|---|---|---|---|---|

VULNERABILITY = R7-YnIY4JxNkOFvtUl+sN38zw= =

| NUMBER | SUMMARY | BULLETIN | SOLUTION TYPE | RISK SCORE | RISK RATING | VULNERABLE ITEMS | REMAINING CLS | HIGHEST SUPERSEDENCE | DATE PUBLISHED |
|---|---|---|---|---|---|---|---|---|---|
| ⊙VS0003662 | JULY 16, 2018-KB4345418 (OS Build 14393.2368) | JULY 2018 SECURITY UPDATES | VENDOR FIX | S4 | 3-MEDIUM | 153,414 | 2,280 | FALSE | 2017-07-10 00:00:00 |
| ⊙VS0003517 | JANUARY 3, 2018-KB4056892 (OS Build 16299.192) | JANUARY 2018 SECURITY UPDATES | VENDOR FIX | S2 | 3-MEDIUM | 15,920 | 703 | FALSE | 2017-07-10 00:00:00 |
| ⊙VS0003625 | SOLUTION FOR CVE-2018-0746, CVE-2018-0747, CVE-2018-0751, CVE-2018-0752, CVE-2018-0753, CVE-2018-0786, CVE-2018-0803, CVE-2018-0749, CVE-2018-0754, CVE-2018-0758 AND OTHERS DISPLAYED IN THE CVE RELATED LIST | JANUARY 2018 SECURITY UPDATES | ENTITLE-MENT | 0 | 5-NONE | 0 | 0 | TRUE | 2017-07-10 00:00:00 |
| ⊙VS0003677 | JULY 16, 2018-KB4345420 (OS Build 16299.551) | JULY 2018 SECURITY UPDATES | VENDOR FIX | S2 | 3-MEDIUM | 17,212 | 716 | TRUE | 2017-07-10 00:00:00 |

MARCH 2018

| | | | |
|---|---|---|---|
| ☐ ⓘ VS0003266 | AUGUST 14, 2018–KB4343887 (OS Build 14393.2430) | JULY 2018 SECURITY UPDATES | VENDOR FIX |
| ☑ ⓘ VS0003663 | SOLUTION FOR CVE-2018-0773, CVE-2018-0774, CVE-2018-0781, CVE-2018-0800, CVE-2018-0758, CVE-2018-0762, CVE-2018-0767, CVE-2018-0768, CVE-2018-0769, CVE-2018-0770, CVE-2018-0772, CVE-2018-0775 AND OTHERS DISPLAYED IN THE CVE RELATED LIST | JANUARY 2018 SECURITY UPDATES | VENDOR FIX |
| ☐ ⓘ VS0003541 | JANUARY 3, 2018–KB4056893 (OS Build 10240.17738) | JANUARY 2018 SECURITY UPDATES | VENDOR FIX |
| ☑ ⓘ VS0002395 | JULY 10, 2018–KB4338825 (OS Build 16299.547) | JULY 2018 SECURITY UPDATES | VENDOR FIX |
| ☐ ⓘ VS0002771 | APRIL 10, 2018–KB4093119 (OS Build 14393.2189) | APRIL 2018 SECURITY UPDATES | VENDOR FIX |
| ☑ ⓘ VS0003711 | JULY 16, 2018–KB4345455 (OS Build 10240.17918) | JUNE 2018 SECURITY UPDATES | VENDOR FIX |
| ☑ ⓘ VS0002782 | APRIL 10, 2018–KB4093111 (OS Build 10240.17831) | APRIL 2018 SECURITY UPDATES | VENDOR FIX |
| ☐ ✓ ACTIONS ON SELECTED ROWS... EXCLUDE CREATE APPLICATION FILE ASSIGN TAG NEW TAG | | JULY 2018 SECURITY UPDATES | VENDOR FIX |

FIG. 15

SYSTEM AND METHOD FOR SOLUTION RESOLUTION FOR VULNERABILITIES IDENTIFIED BY THIRD-PARTY VULNERABILITY SCANNERS

CROSS REFERENCE TO RELATED APPLICATIONS

This application is a continuation of U.S. patent application Ser. No. 16/813,348, entitled, "SYSTEM AND METHOD FOR SOLUTION RESOLUTION FOR VULNERABILITIES IDENTIFIED BY THIRD-PARTY VULNERABILITY SCANNERS," filed on Mar. 9, 2020, which claims priority from and the benefit of U.S. Provisional Application No. 62/935,571, entitled "SYSTEM AND METHOD FOR SOLUTION RESOLUTION FOR VULNERABILITIES IDENTIFIED BY THIRD-PARTY VULNERABILITY SCANNERS," filed Nov. 14, 2019, which are incorporated by reference herein in their entirety for all purposes.

BACKGROUND

The present disclosure relates generally to vulnerability response and solution management, and, more specifically, to managing relationships between vulnerabilities and solutions in a computer network environment.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Certain cloud computing services may host a client instance having a configuration management database (CMDB), which tracks information regarding configuration items (CIs) associated with a client. For example, these CIs may include hardware, software, and combinations thereof, disposed on, or operating within, a client network. Additionally, a customer may also use a third-party scanner (TPS) that scans for vulnerabilities pertaining to CIs operating on the client network. The TPS may be configured to provide vulnerability scan data to a vulnerability response (VR) server of the client instance, and a service associated with the TPS can provide additional information to the client instance regarding the particular vulnerabilities. Similarly, a solution management server of the client instance may receive common vulnerabilities and exposures (CVE) data from a CVE service, as well as solutions (e.g., software patches or updates) to resolve vulnerabilities from third-party vendors.

However, it is presently recognized that TPSs typically rely on a proprietary identification scheme that is not standardized across the industry. Depending on the TPS, a TPS may be related to zero or more CVEs in data received from the TPS service. Additionally, solutions from third-party vendors are usually associated with one or more CVEs. While CVEs rely on CVE identifiers (CVE IDs) that are standardized across the industry for a particular vulnerability, the same CVE ID may be assigned to the same vulnerability on a different platform (e.g., a different software version, operating system, hardware, and so forth). As such, even though a solution is associated with a particular CVE, the solution may not actually be suitable to resolve the vulnerability on the particular platform on which a vulnerability is detected. As such, it is presently recognized that there is a deficiency with respect to identifying relationships between vulnerabilities identified by a TPS and solutions provided by third-party vendors, such that appropriate solutions can be recommended to resolve identified vulnerabilities.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to a vulnerability-solution resolution system (hereinafter "VSRS" or "VSR system") that is designed to create and maintain relationships or associations between vulnerabilities identified by third-party scanners (TPSs) and solutions, such as software patches received from third-party vendors. The VSRS includes a data scheme that enables information regarding vulnerabilities and solutions to be stored, and enables certain relationships to be automatically created between these vulnerabilities and solutions. In particular, the VSRS is designed to automatically form certain relationships between particular vulnerabilities and solutions based on solution supersedence and inheritance. Additionally, the VSRS includes a graphical user interface (GUI) that enables a user to exclude particular relationships from consideration when recommending solutions to resolve a vulnerability or when calculating metrics regarding the vulnerability.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIGS. 14A, 14B, and 15 are simulated screenshots of an embodiment of a graphical user interface (GUI) that is designed to receive user requests to exclude a relationship between a vulnerability and a solution, in accordance with aspects of the present disclosure.

DETAILED DESCRIPTION

Figure 1:
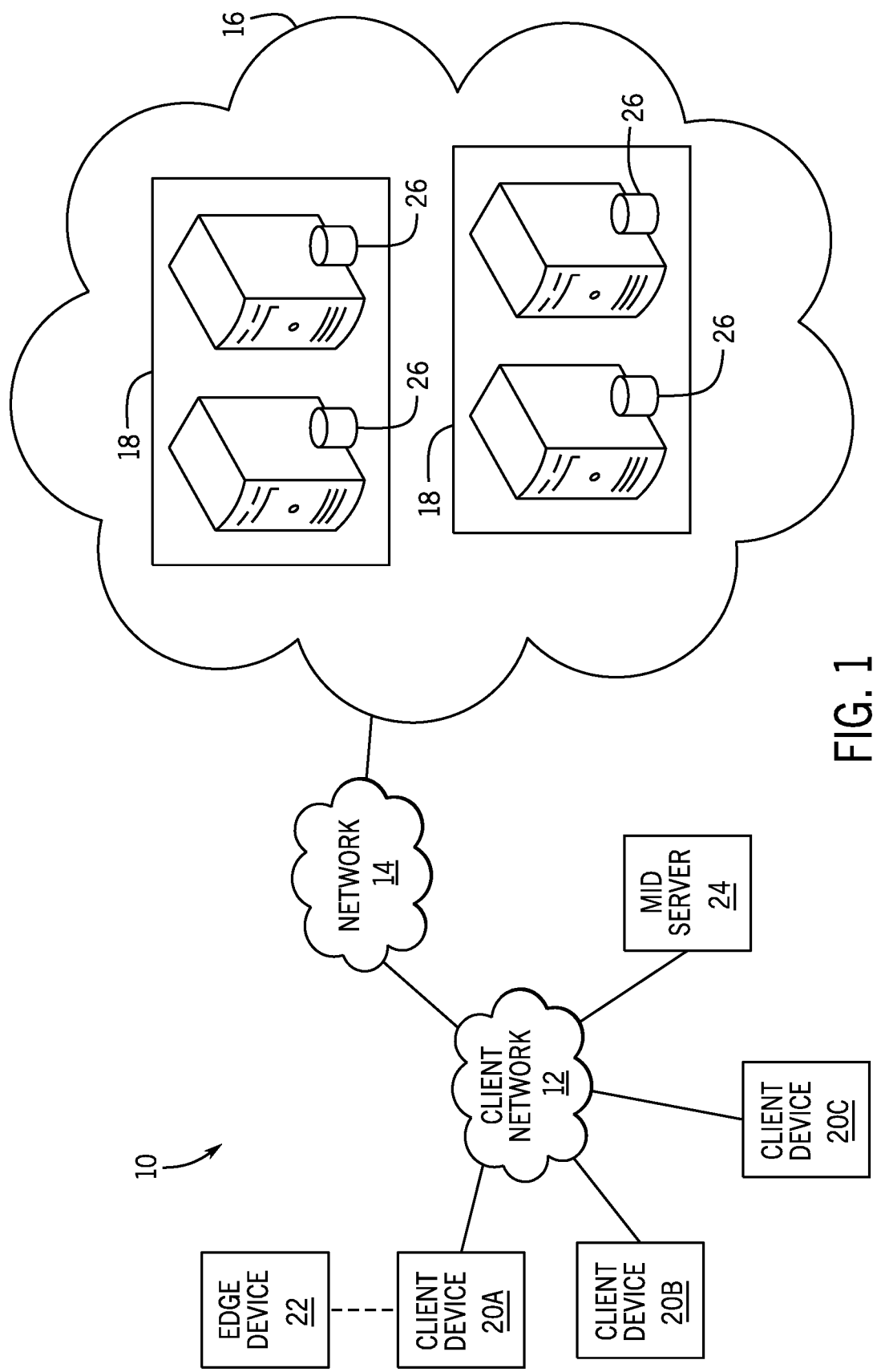
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a CMDB.

As used herein, a "vulnerability" refers to an issue, such as a weakness or deficiency, of a CI, and its related information, as detected by a third-party scanner. As used herein, a "solution" refers to a resolution to an issue, such as a CI vulnerability, and its related information. As discussed below, solutions are typically received from software vendors.

Present embodiments are directed to a vulnerability-solution resolution system (VSRS) that is designed to build and maintain relationships between vulnerabilities identified by third-party scanners (TPSs) and solutions, such as software patches received from third-party vendors. The VSRS includes a data scheme that enables information regarding vulnerabilities and solutions to be stored, and enables certain relationships to be automatically generated between these vulnerabilities and solutions. In particular, the VSRS is designed to automatically form certain relationships between particular vulnerabilities and solutions based on solution supersedence and inheritance. Additionally, the VSRS enables a user to exclude particular relationships from consideration when recommending solutions to resolve a vulnerability or when calculating metrics regarding the vulnerability.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., a unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
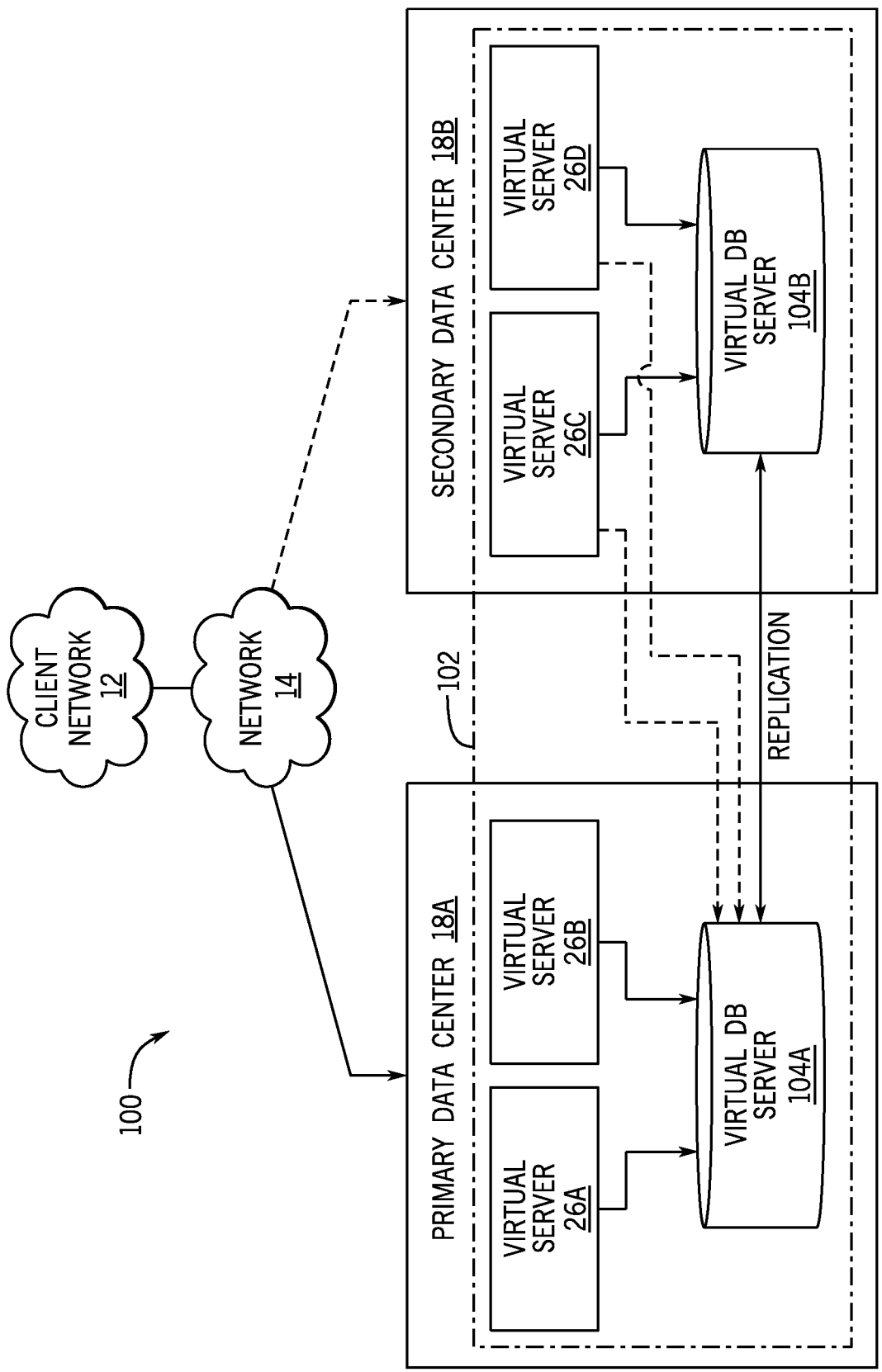
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
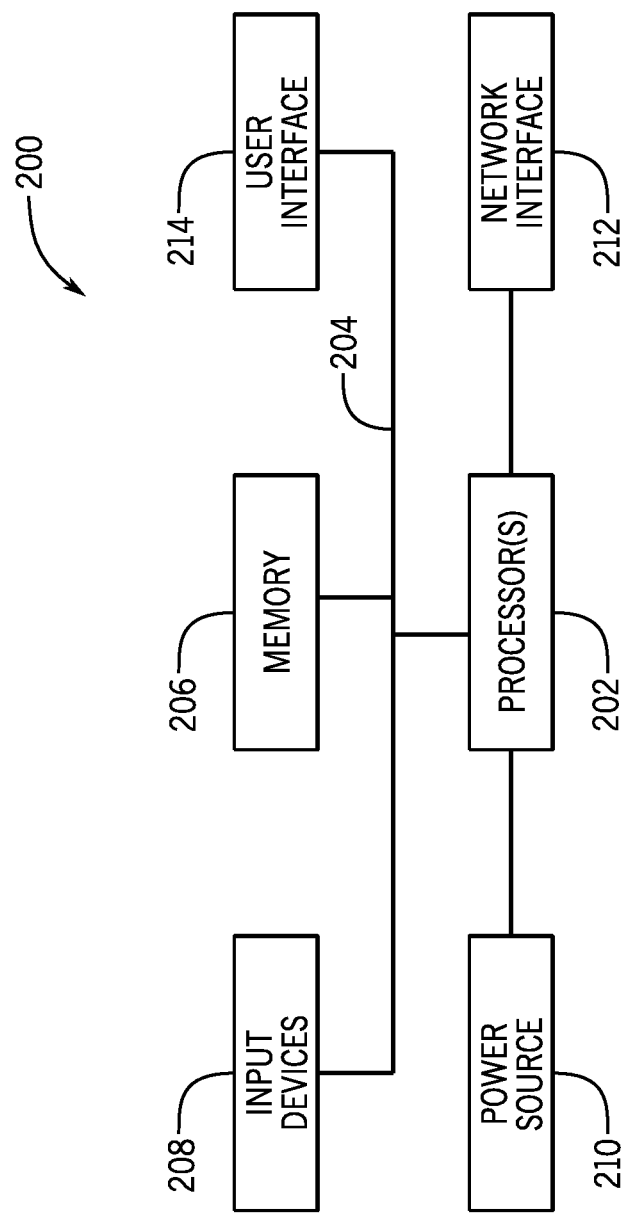
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. In some embodiments, the instructions may be pipelined from execution stacks of each process in the memory 206 and stored in an instruction cache of the one or more processors 202 to be processed more quickly and efficiently. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4A:
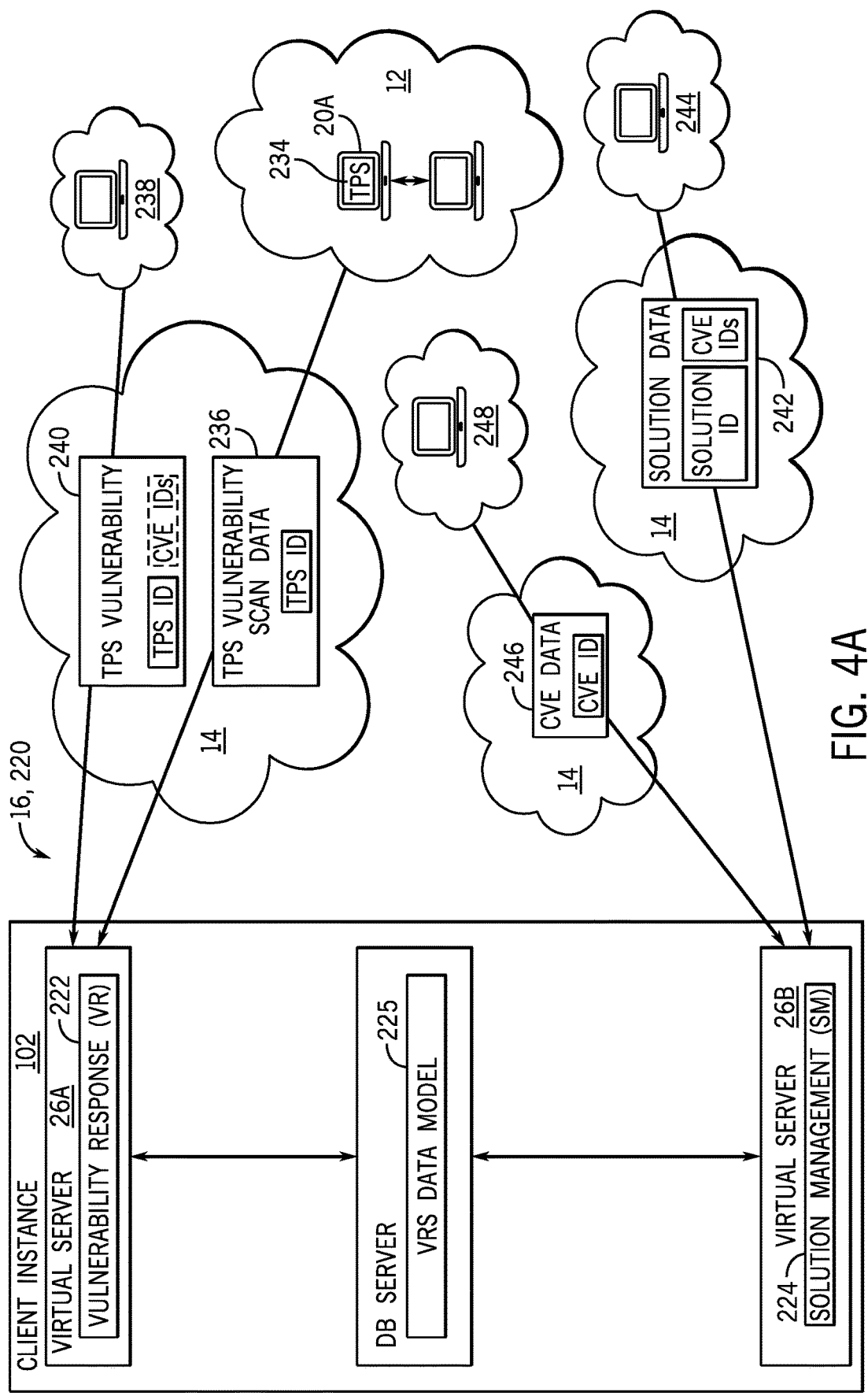
FIG. 4A is a block diagram illustrating a client instance that includes a vulnerability-solution resolution system (VSRS), wherein the VSRS includes a vulnerability response (VR) server and a solution management (SM) server that cooperate to build and maintain relationships between vulnerabilities identified by third-party scanners (TPSs) and solutions, in accordance with aspects of the present disclosure.

With the preceding in mind, FIG. 4A is a block diagram illustrating an embodiment in which virtual servers 26A and 26B support and enable the client instance 102, according to one or more disclosed embodiments. More specifically, FIG. 4A illustrates an example of a portion of a service provider cloud infrastructure, including the cloud-based platform 16 discussed above. The cloud-based platform 16 is connected to client devices 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

More specifically, the client instance 102 illustrated in FIG. 4A hosts a vulnerability-solution resolution system (VSRS) 220, which includes a vulnerability response (VR) server 222 hosted by virtual server 26A and a solution management (SM) server 224 hosted by virtual server 26B that are communicatively coupled to the database server 104. It may also be noted that, while the illustrated embodiment includes separate virtual machines 26A and 26B respectively hosting the VR server 222 and the SM server 224 in FIG. 4A, in other embodiments, both servers 222 and 224 may be hosted by the same virtual machine, or any number of other virtual machines 26 associated with the client instance 102. For example, in certain embodiments, both virtual machines 26A and 26B, as well as any other virtual machines 26 associated with the client instance 102, may store the corresponding instructions for both the VR server 222 and the SM server 224. For such embodiments, since all virtual machines 26 of the client instance 102 are capable of executing the VR server 222 and the SM server 224 application code, a load balancer of the cloud-based platform 16 determines at run time which virtual machine 26 of the client instance 102 processes an incoming VR or SM communication or request.

Figure 4B:
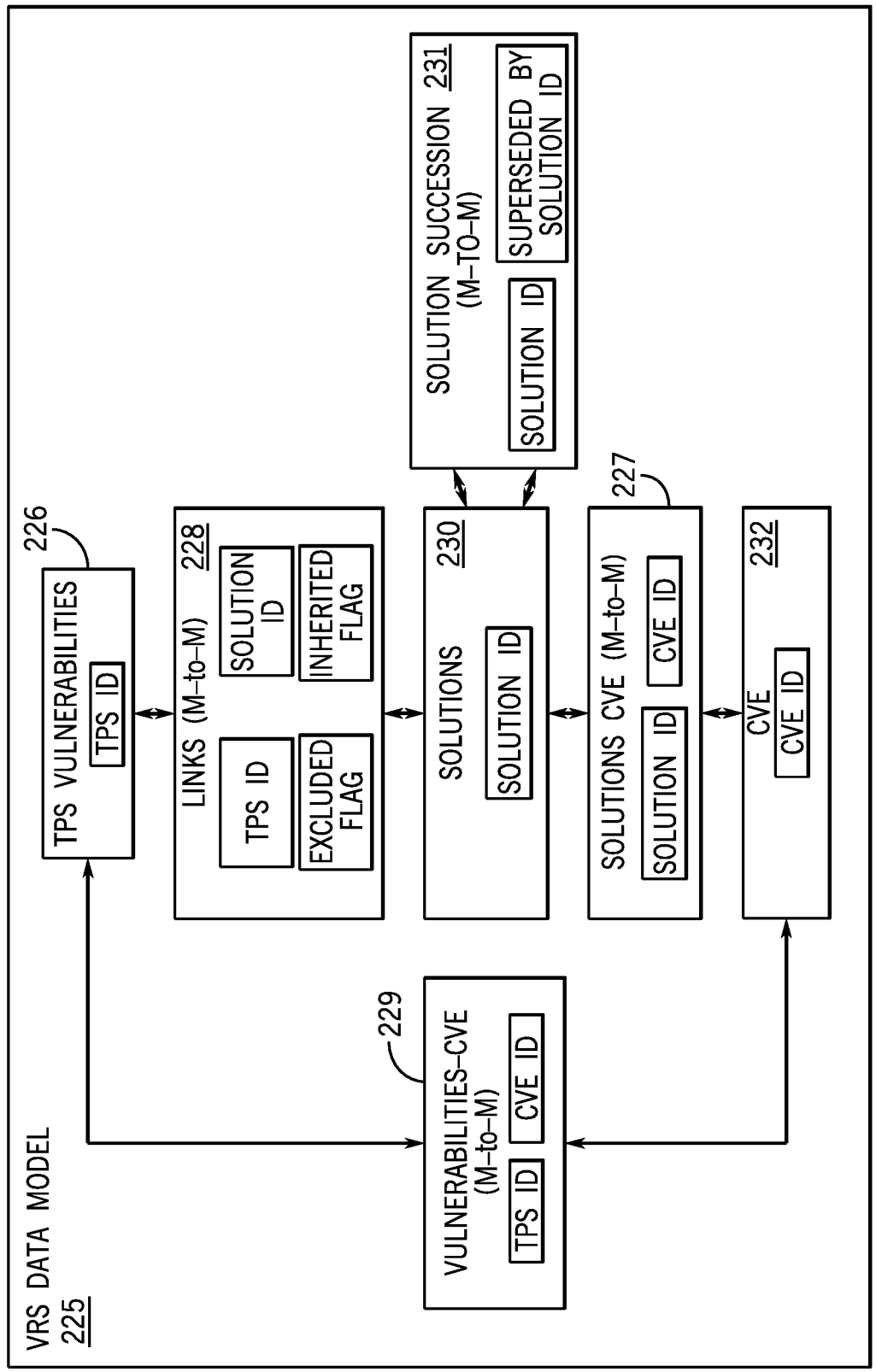
FIG. 4B is a block diagram of an embodiment of a data model of the VSRS of FIG. 4A, in accordance with aspects of the present disclosure.

FIG. 4B is a block diagram of an embodiment of a VRS data model 225 or data schema used by the VSRS 220 of FIG. 4A. The illustrated data model 225 of FIG. 4B has a number of different data tables, including a TPS Vulnerabilities table 226, a Solutions table 230, and a CVE table 232, that are suitably related to one another, as illustrated. In particular, the illustrated data model 225 includes a Links table 228 that is a many-to-many (M-to-M) table capable of relating one or more TPS IDs of vulnerabilities stored in the TPS Vulnerabilities table 226 to one or more Solution IDs of solutions stored in the Solutions table 230. The illustrated data model 225 includes a Solutions-CVE table 227 that is a many-to-many (M-to-M) table capable of relating one or more Solution IDs of solutions stored in the Solutions table 230 to one or more CVE IDs stored in the CVE table 232. The illustrated data model 225 also includes a Vulnerabilities-CVE table 229 that is a many-to-many (M-to-M) table capable of relating one or more TPS IDs of vulnerabilities stored in the TPS Vulnerabilities table 226 to one or more CVE IDs stored in the CVE table 232. Additionally, the illustrated data model 225 also includes a Solution Succession table 231 that is a many-to-many (M-to-M) table capable of relating one or more Solution IDs of solutions stored in the Solutions table 230 to one or more Solution IDs of superseding solutions also stored in the Solutions table 230, as discussed below. It may be appreciated that the illustrated data model 225 is merely an example, and in other embodiments, the data model 225 may be implemented using a different table structure, in accordance with the present disclosure.

The VR server 222 and the SM server 224 of FIG. 4A are configured to receive data from computing resources or services that are external to the client instance 102 via the network 14. For the illustrated embodiment, the client network 12 includes a client device 20A that hosts a third-party scan (TPS) application 234. The TPS application 234 is designed to scan CIs of the client network 12 for vulnerabilities, and to provide TPS vulnerability scan data 236 to the VR server 222. For example, the TPS application may include QUALYS (available from Qualys, Inc. of Foster City, Calif.), RAPID7 (available from Rapid7 of Boston, Mass.), or another suitable TPS application. Each vulnerability in the TPS vulnerability scan data 236 is assigned a unique TPS identifier (TPS ID) by the TPS application 234. Additionally, a TPS service 238 associated with the TPS application 234 may provide the VR server 222 with TPS vulnerability data 240 that includes additional details (e.g., software, operating system, operating system version, discovery date, detection date, a textual description) regarding each vulnerability. Each vulnerability in the TPS vulnerability data 240 includes a respective TPS ID and can be related to zero or more CVE identifier (CVE IDs) values. The received TPS vulnerability data 240 may be imported into the TPS Vulnerabilities table 226, as discussed below with respect to FIG. 5.

For the illustrated embodiment, the SM server 224 may receive solution data 242 from an update service 244 of a third-party vendor. Each solution is assigned a unique Solution ID by the vendor, and each solution is associated with at least one CVE ID value. The received solution data may be imported into the Solutions table 230 as discussed below with respect to FIG. 6. The received solution data generally includes details regarding each solution, such as the solution vendor, the software and version, the operating system and version, a patch or description of a configuration adjustment to resolve the underlying vulnerability, a release date, a date when the solution was superseded by another solution, a textual description of the solution, and so forth. In certain embodiments, instead of being received from the update service 244, certain solutions may also be manually created, related to a CVE, and added to the Solutions table 230 by a suitably authorized user. The SM server 224 also receives CVE data 246 from a suitable CVE service 248, wherein each CVE listed in the CVE data 246 includes a respective CVE ID, as well as details for the CVE (e.g., release date, software version, operating system version, a textual description of the CVE, etc.).

Figure 5:
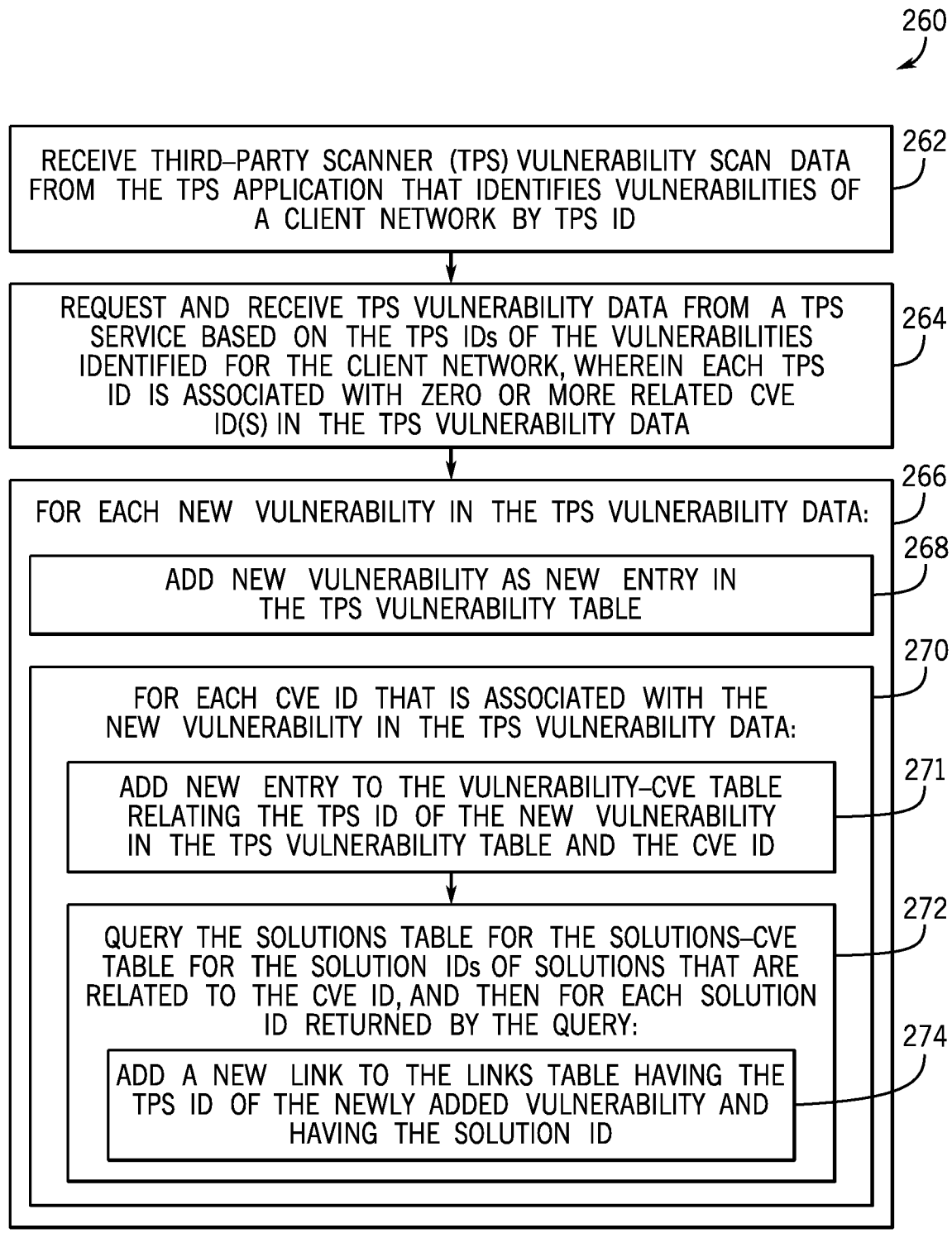
FIG. 5 is a flow diagram of a process by which the VR server receives vulnerability data from the TPS and builds relationships between new vulnerabilities and existing solutions, in accordance with aspects of the present disclosure.

FIG. 5 is a flow diagram illustrating an embodiment of a process 260 by which the VR server 222 receives TPS scan and vulnerability data 236 and 240, and then uses this data to build relationships between new vulnerabilities and existing solutions. It may be appreciated that the illustrated process 260 is merely provided as an example, and in other embodiments, the process 260 may include additional steps, fewer steps, repeated steps, and so forth, in accordance with the present disclosure. Additionally, the process 260 is discussed with reference to elements illustrated FIGS. 4A and 4B.

The embodiment of the process 260 illustrated in FIG. 5 begins with the VR server 222 receiving (block 262) TPS vulnerability scan data 236 from the TPS application 234 operating on the client network 12. As mentioned, the TPS vulnerability scan data 236 uniquely identifies detected vulnerabilities by TPS ID. The process continues with the VR server 222 requesting and receiving (block 264) TPS vulnerability data 240 from the TPS service 238 based on the TPS IDs listed in the received TPS vulnerability scan data 236.

For the embodiment illustrated in FIG. 5, the process 260 continues with the VR server 222 performing a series of actions for each vulnerability in the TPS vulnerability data 240 that is not already present within the TPS Vulnerabilities table 226, as indicated by block 266. It may be appreciated that restricting importation to only new vulnerabilities prevents the system from inadvertently overwriting relationship exclusions previously requested by a user, as discussed below. For the illustrated embodiment, the actions of block 266 include, adding (block 268) the new vulnerability as a new entry or record in the TPS Vulnerabilities table 226.

Additionally, when one or more CVE IDs are associated with the TPS ID in the received TPS vulnerability data 240, the VR server 222 may perform a number of actions for each individual CVE ID, as indicated by the block 270. For the illustrated embodiment, these actions include adding (block 271) a new entry to the Vulnerabilities-CVE table 229 that relates the TPS ID of the new vulnerability in the TPS Vulnerability table 226 and the associated CVE ID, thereby relating the vulnerability and the CVE within the data model 225. For the illustrated embodiment, the actions of block 270 also include querying (block 272) the Solutions table 230 and the Solutions-CVE table 227 for the Solution IDs of solutions that are related to the CVE ID, and then for each of the Solution IDs returned by the query, adding (block 274) a new link to the Links table 228. This new link is assigned the TPS ID of the newly added entry in the TPS Vulnerabilities table 226, and assigned the current Solution ID of the for each loop of block 272. As such, it may be appreciated that the actions of blocks 270, 272, and 274 involve the VR server 222 building certain relationships between vulnerabilities and solutions, when the related CVE information is provided as part of the TPS vulnerability data. It may also be appreciated that other portions of the received TPS vulnerability data may additionally or alternatively be used to automatically construct or refine these relationships. For example, as discussed in greater detail below, a vulnerability may include a field indicating to the operating system to which the vulnerability correspond, and a solution also may include a field indicating the operating system to which the solution correspond. As such, the VR server 222 may create relationships as links in the Links table 228 between the TPS ID of the vulnerability in the TPS Vulnerabilities table 226 and Solution IDs of solutions in the Solutions table 230 that match with respect to the operating system, or establish links that are excluded (e.g., an "Excluded" flag field set to true) for vulnerabilities and solutions that do not meaningfully match.

Figure 6:
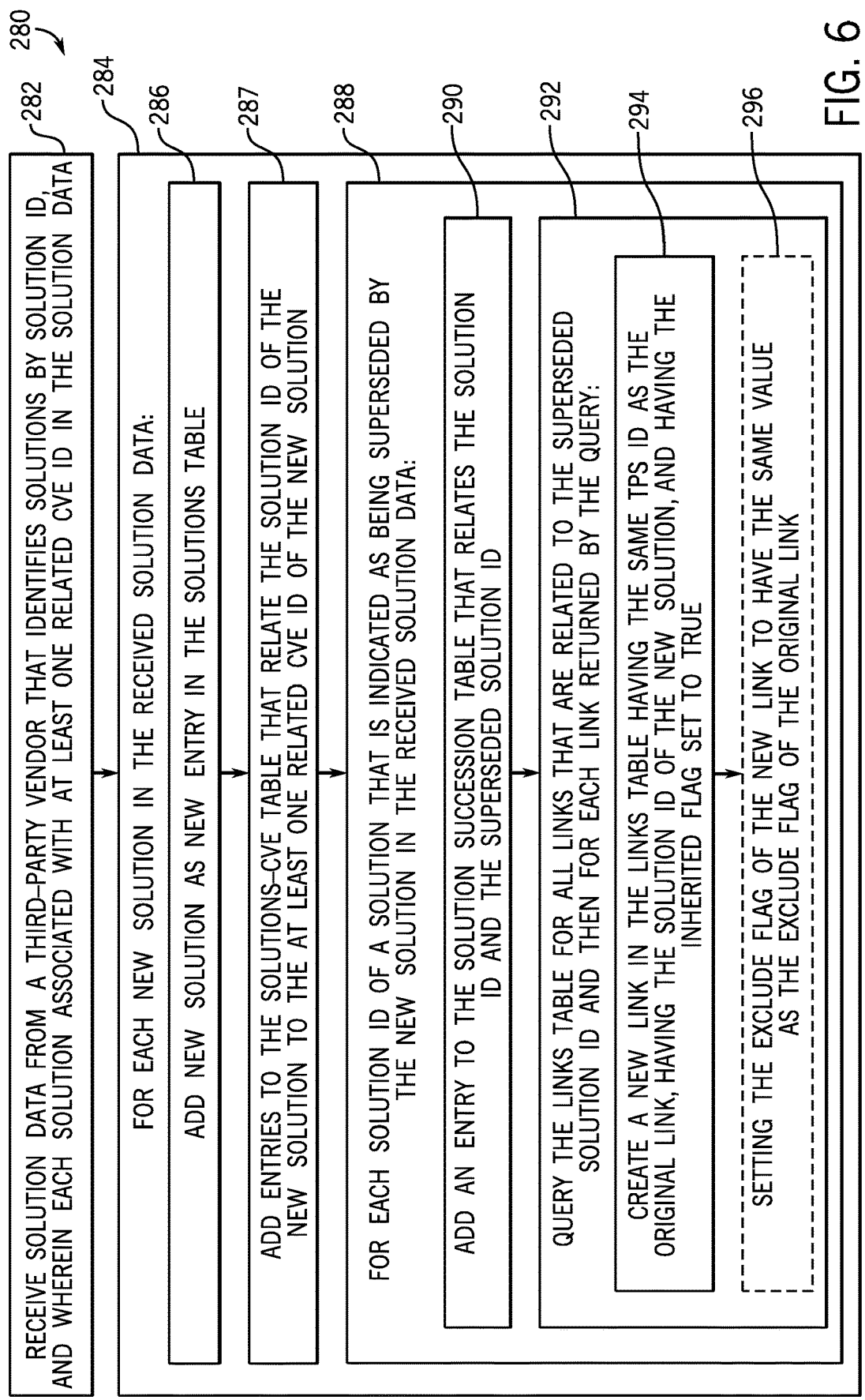
FIG. 6 is a flow diagram of a process by which the SM server receives solution data from a third-party vendor and builds relationships between new solutions and existing vulnerabilities, in accordance with aspects of the present disclosure.

FIG. 6 is a flow diagram illustrating an embodiment of a process 280 by which the SM server 224 receives the solution data 242 from a third-party vendor and builds relationships between new solutions and existing vulnerabilities. It may be appreciated that the illustrated process 280 is merely provided as an example, and in other embodiments, the process 280 may include additional steps, fewer steps, repeated steps, and so forth, in accordance with the present disclosure. Additionally, the process 280 is discussed with reference to elements illustrated FIGS. 4A and 4B.

For the embodiment illustrated in FIG. 6, the process 280 begins with the SM server 224 receiving (block 282) the solution data 242 from a third-party vendor 238 that identifies solutions by Solution ID. As mentioned, each solution is associated with at least one related CVE ID in the solution data 242. In response to receiving the solution data, the SM server 224 may perform a number of actions for each received solution that is not already present within the Solutions table 230, as indicated by the block 284. It may be appreciated that restricting importation to only new solutions prevents the system from inadvertently overwriting relationship exclusions previously requested by a user, as discussed below. For the illustrated embodiment, the actions of block 284 include adding (block 286) the new solution as a new entry in the Solutions table 230, and then adding (block 287) entries to the Solutions-CVE table 227 that associate the Solution ID of the new solution in the Solutions table 230 and the at least one related CVE ID of the new solution, thereby relating each solution to its corresponding CVE within the data model 225.

For the embodiment illustrated in FIG. 6, when the newly received solution includes one or more fields indicating that the solution supersedes an existing solution in the Solutions table 230, then the SM server 224 may perform a number of actions for each superseded Solution ID, as indicated by block 288. For the illustrated embodiment, these actions include adding or modifying (block 290) an entry in the Solution Succession table 231 that relates the Solution ID of each superseded solution to the Solution ID of the new, superseding solution. Additionally, the SM server 224 may query the Links table 228 for all links that are related to the superseded Solution ID, and then perform a number of actions for each link returned by the query, as indicated by block 292. For the illustrated embodiment, these actions include creating (block 294) a new link in the Links table 228 having the same TPS ID as the original link, having the Solution ID of the new solution, and having the Inherited flag set to true. It may be appreciated that the actions of block 294 result in a new solution inheriting the pre-existing relationships between vulnerabilities and the superseded solution. Additionally, for embodiments in which it is desirable for exclusion to be inherited as well, the SM server 224 may also set (block 296) the Exclude flag field of the newly created link to have the same values as the Exclude flag field of the current link of the for-each loop of block 292.

Figure 7:
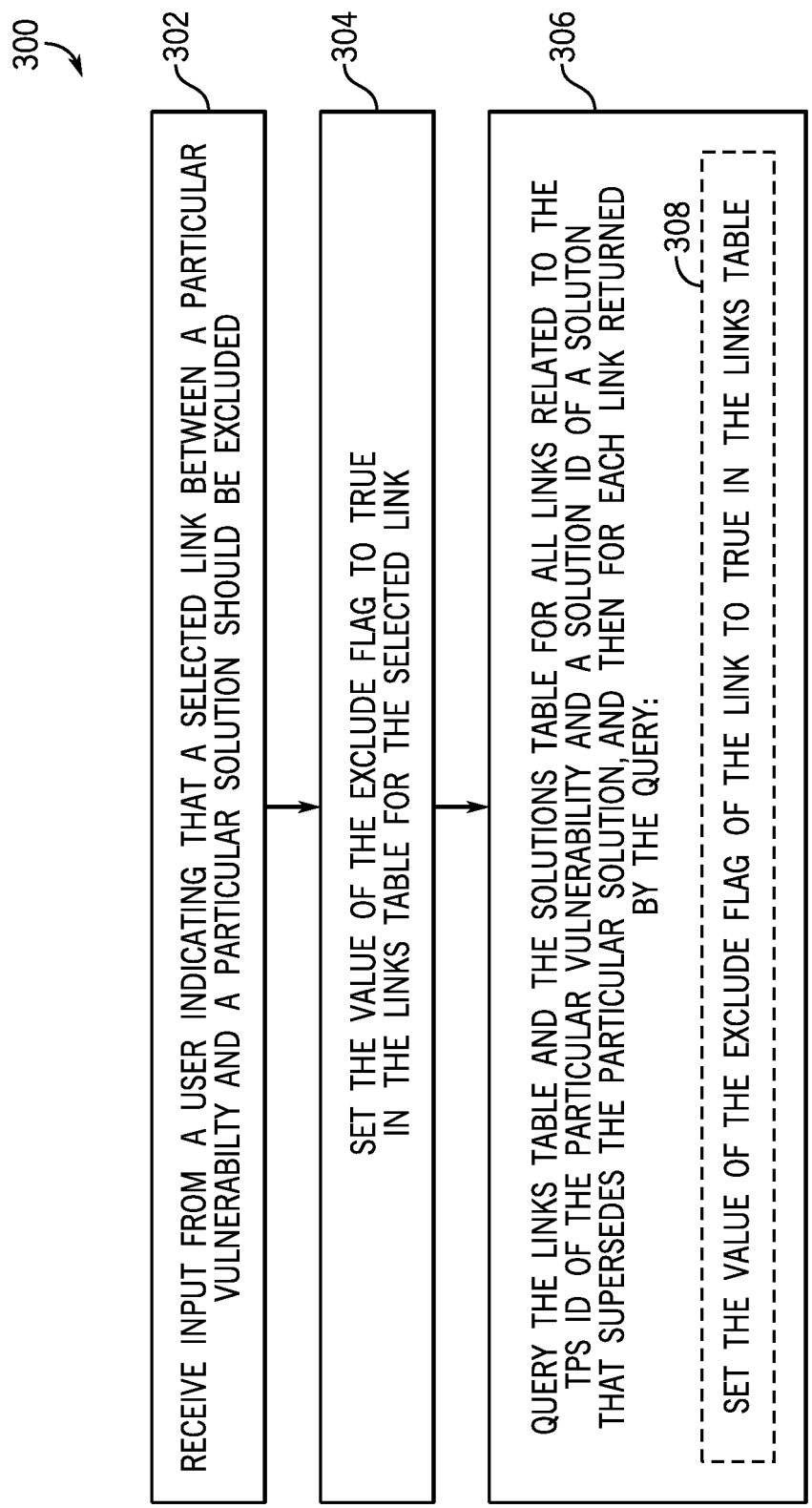
FIG. 7 is a flow diagram of a process by which the VSRS receives and responds to a user request to exclude a relationship between a vulnerability and a solution, in accordance with aspects of the present disclosure.

FIG. 7 is a flow diagram illustrating an embodiment of process 300 by which the VSRS 220, such as the VR server 222 and/or the SM server 224, receives and responds to a user request to exclude a relationship between a vulnerability and a solution. It may be appreciated that the illustrated process 300 is merely provided as an example, and in other embodiments, the process 300 may include additional steps, fewer steps, repeated steps, and so forth, in accordance with the present disclosure. Additionally, the process 300 is discussed with reference to elements illustrated FIGS. 4A and 4B.

For the embodiment illustrated in FIG. 7, the process 300 begins with the VR server 222 receiving (block 302) input from a user indicating that a selected link between a particular vulnerability and a particular solution should be excluded. In response, the VR server 222 sets (block 304) the value of the Exclude flag field to true in the Links table 228 for the selected link. Once the Exclude flag has been set to a value of true, the VSRS 220 will not consider or rely on the relationship defined by the selected link when recommending solutions resolve the particular vulnerability. For embodiments in which it is desirable for exclusion to be cascaded up the chain of superseding solutions, the VR server 222 may query the Links table 228 and the Solutions table 230 to identify all links having both the TPS ID of the particular vulnerability and the Solution ID of a solution that supersedes the particular solution, as indicated by block 306. Then, the VR server 222 may also set (block 308) the value of the Exclude flag field to true for each of the links returned by the query. As such, the actions of blocks 306 and 308 enable the exclusion of the relationship between a vulnerability and a solution to be automatically extended to, or inherited by, all superseding solutions as well.

Figure 8:
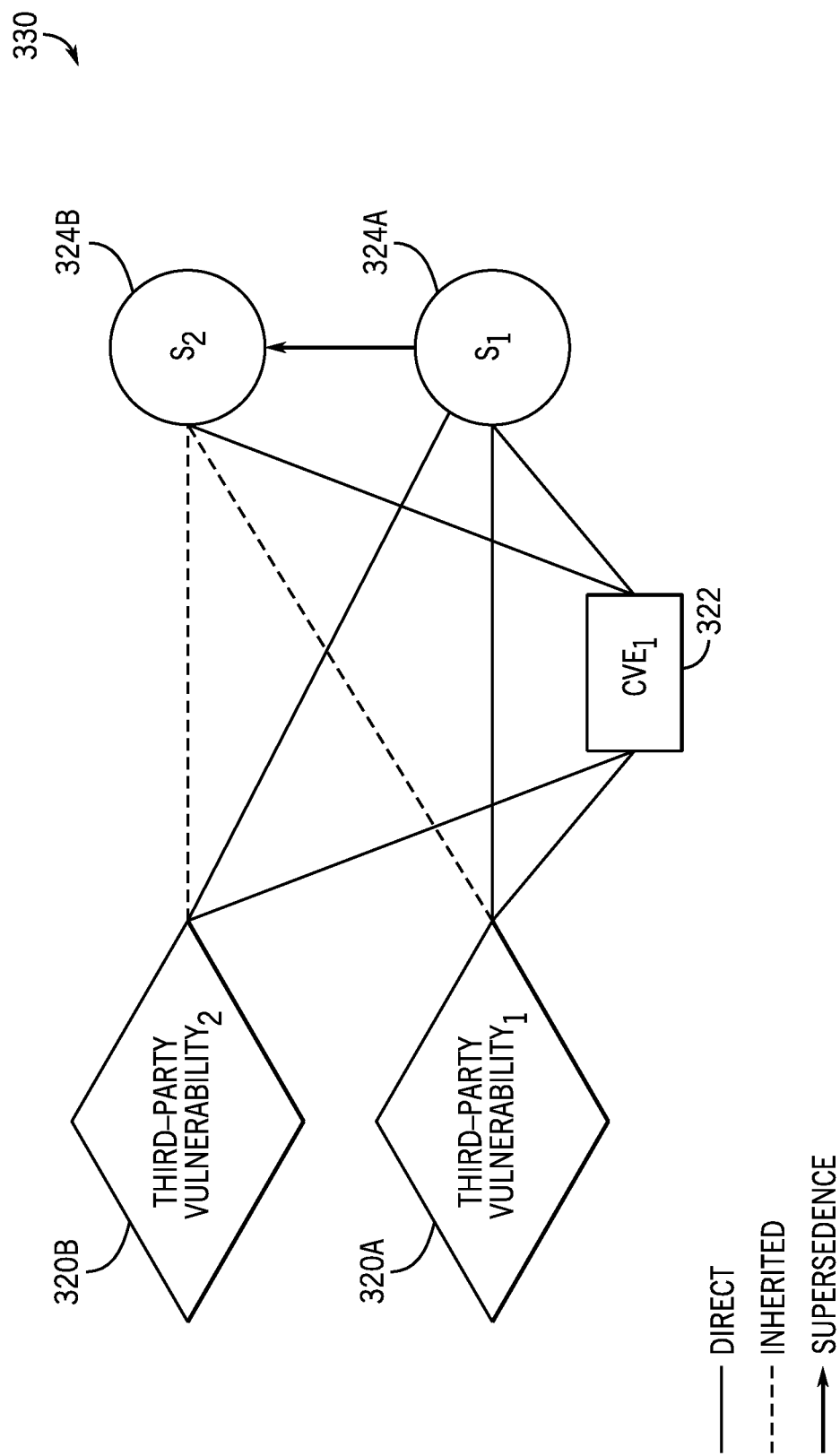
FIGS. 8, 9, 10, 11, 12, and 13 are schematic diagrams visually depicting relationships between vulnerabilities, solutions, and CVEs, in accordance with aspects of the present disclosure.
Figure 9:
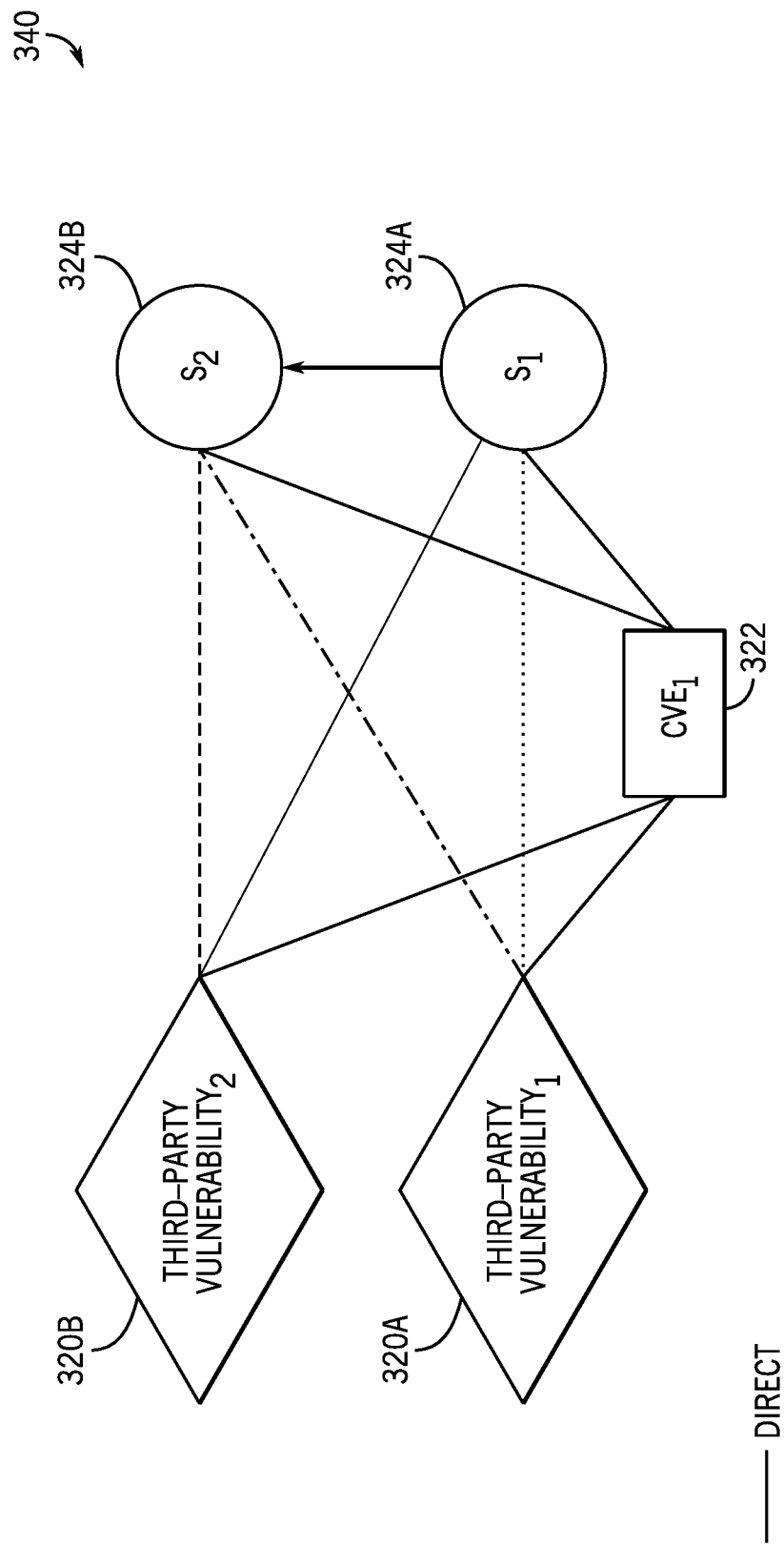

FIGS. 8 and 9 are schematic diagrams visually depicting relationships between vulnerabilities, solutions, and CVEs, in accordance with aspects of the present disclosure. As such, the vulnerabilities 320A and 320B are stored as entries in the TPS Vulnerabilities table 226, the CVE 322 is stored as an entry in the CVE table 232, and the solutions 324A, 324B, and 324C are stored as entries in the Solutions table 230. Additionally, relationships between the vulnerabilities and the solutions are stored in the Links table 228, as discussed above.

The graph 330 of FIG. 8 illustrates a set of relationships between vulnerabilities 320A and 320B, solutions 324A and 324B, and CVE 322. More specifically, the graph 330 illustrates a situation in which solution 324B supersedes solution 324A. As such, when solution 324B is initially imported into the database, for example, using the process 280 illustrated in FIG. 6, then new links are created in the Links table 228 between vulnerability 320A and solution 324B, as well as between vulnerability 320B and solution 324B, in which the Inherited flag fields are set to true.

The graph 340 of FIG. 9 illustrates a set of relationships between vulnerabilities 320A and 320B, solutions 324A and 324B, and CVE 322. More specifically, the graph 340 illustrates a situation in which solution 324B supersedes solution 324A after the Excluded flag field was previously set to true for the link between vulnerability 320A and solution 324A. Moreover, this example represents an embodiment in which exclusions are desirably inherited by superseding solutions. As such, when solution 324B is initially imported into the database, for example, using the process 280 illustrated in FIG. 6, then new links are again created between vulnerability 320A and solution 324B, and between vulnerability 320B and solution 324B, in which the Inherited flag fields are set to true. However, since the relationship between vulnerability 320A and solution 324A was previously excluded, the new link created between vulnerability 320A and solution 324B also has the Excluded flag field set to true.

The VSRS 220 may include a graph traversal module (e.g., routine, function) that, when executed by a processor of the VSRS 220, logically traverses relationships depicted in the graphs 330 and 340 to identify a recommended solution to a given vulnerability. In general, this highest superseding solution having a non-excluded link to a given vulnerability may be selected as the recommended solution for the vulnerability. The graph traversal module may navigate the graphs from the perspective of each vulnerability, and includes rules indicating whether a solution can be considered a potential solution to a given vulnerability. For example, when advancing along a supersedence chain in a graph from the perspective of a single vulnerability, arriving at an excluded solution means that solution should not be considered as a possible recommended solution. Additionally, if there are no remaining superseding solutions in the chain, then the solution previous to the solution in the supersedence chain will become the recommended solution for the vulnerability. It is presently recognized that other limiting factors of the graph traversal module may still occur, such diverging paths causing an ambiguity. However, it is presently recognized that, when the graph traversal module rules indicate that, when all superseding solutions along a diverging path are excluded for a vulnerability, then the entire diverging path will not be considered while evaluating the recommended solution for a particular vulnerability. This can result in disambiguation of a graph and allow supersedence chain traversal to arrive at a recommended solution where previously there was ambiguity due to diverging highest supersedence solution paths.

Figure 10:
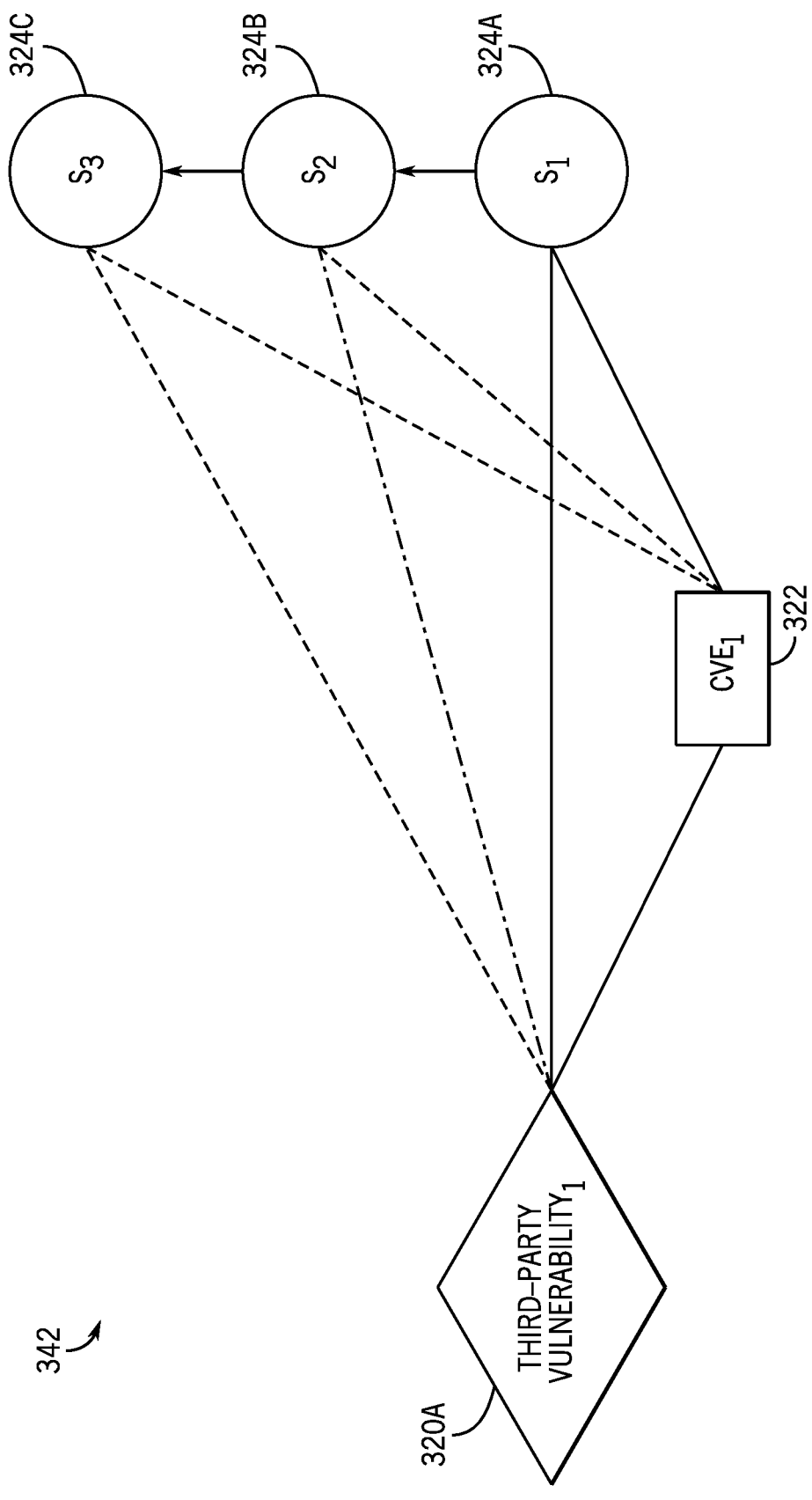

As noted, the graph traversal module may include rules such that, when a solution is excluded relative to a vulnerability, the solution may not be selected as the recommended solution for the vulnerability. In other words, each vulnerability may be associated with a set of excluded solutions that will be used by the graph traversal module during graph traversal to block or prevent the module from selecting one of these solution nodes as the recommended solution. However, the node and relationship still exists and the excluded node may be traversed through in the solution graph. That is, the excluded solution's relationships to other solutions in the graph may still be valid paths to explore for the recommended solution. For example, for the example graph 342 illustrated in FIG. 10, in certain embodiments, the rules of the graph traversal module may be designed such that solution 324C is still a viable solution for the module to select as the recommended solution for the vulnerability 320A, even though the supersedence path is interrupted by the exclusion of solution 324B. For example, one effect this can have is illustrated when a vulnerability has multiple supersedence chains or a diverging supersedence chain as the patch releases follow different paths for different software versions or operating systems.

Figure 11:
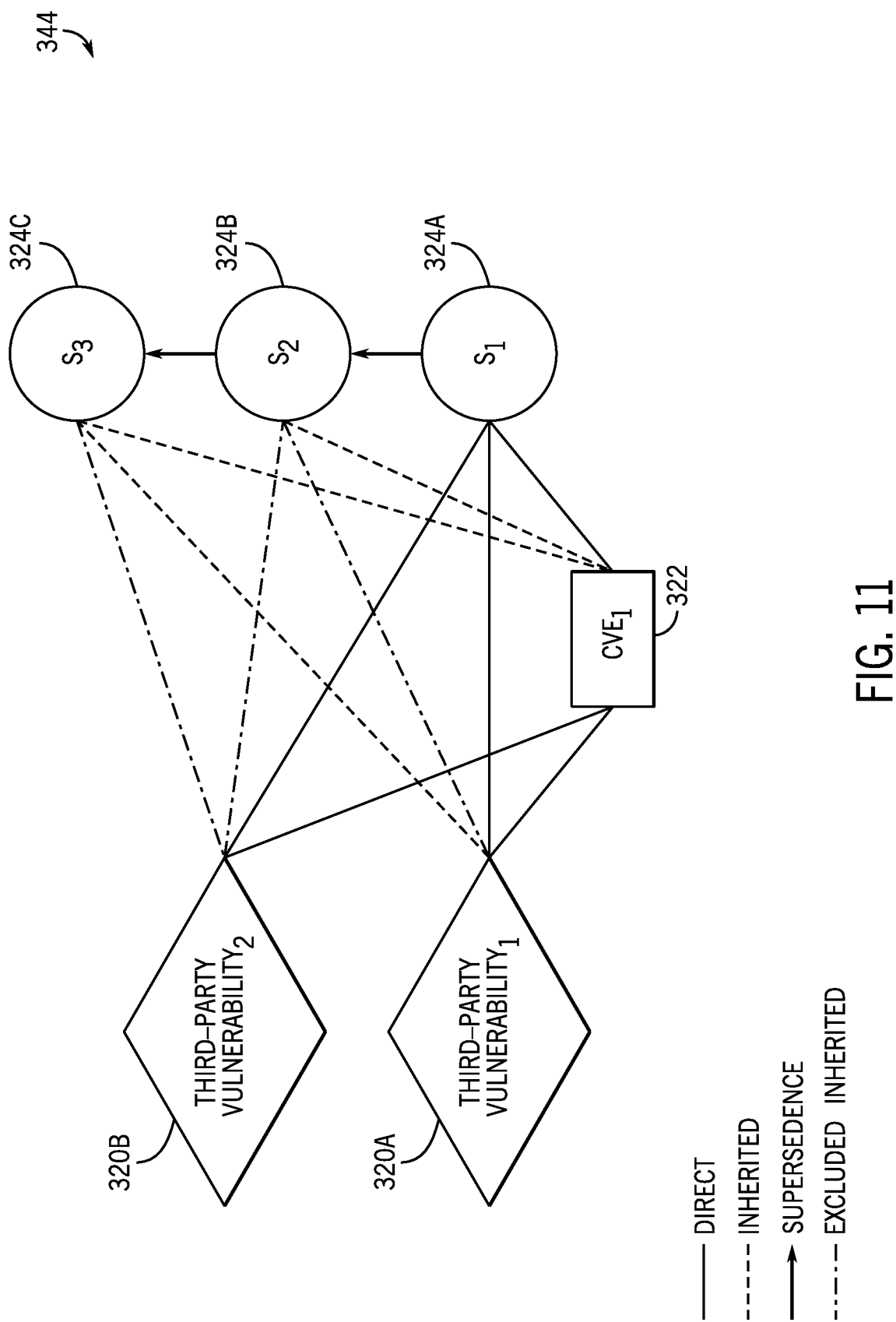
Figure 12:
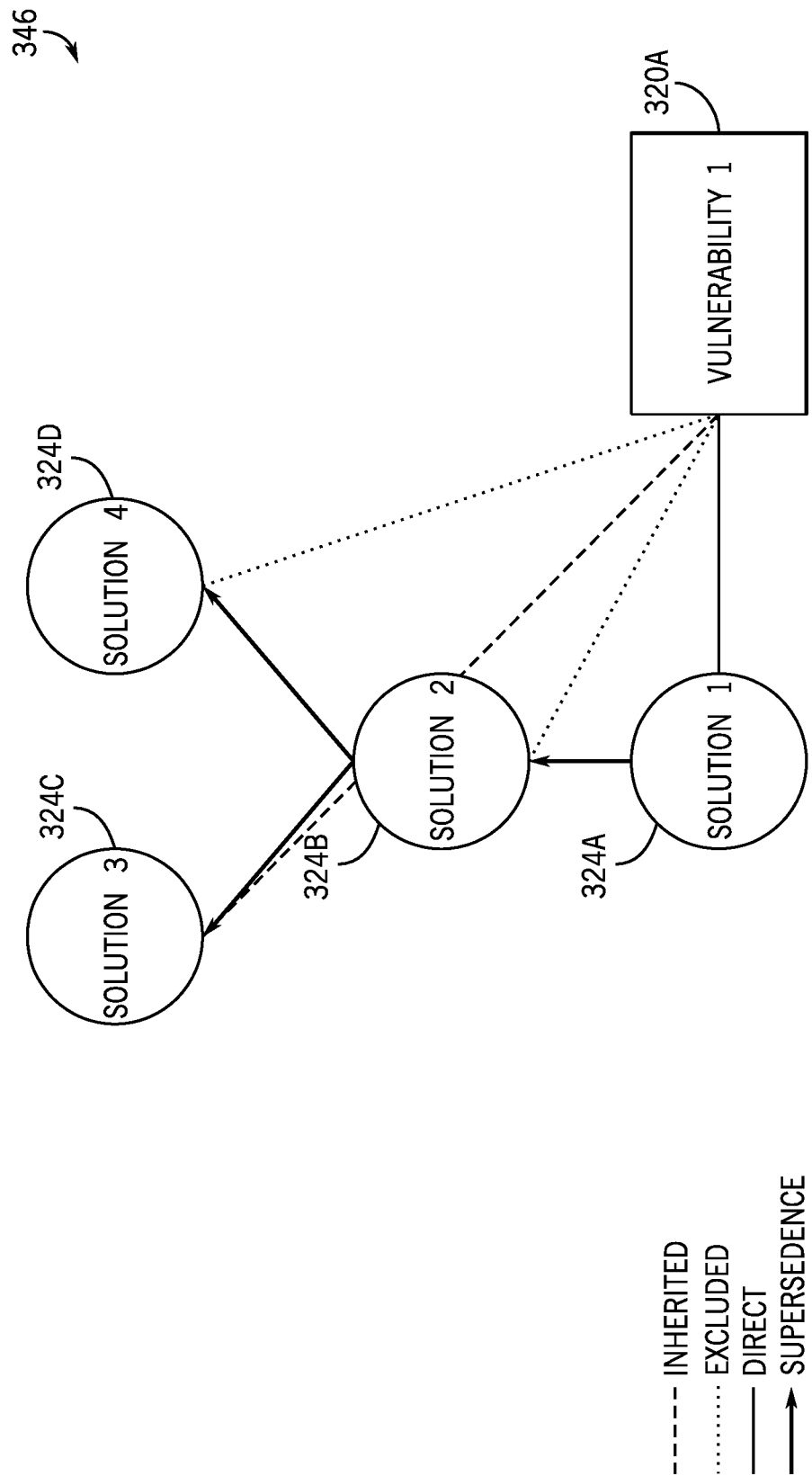
Figure 13:
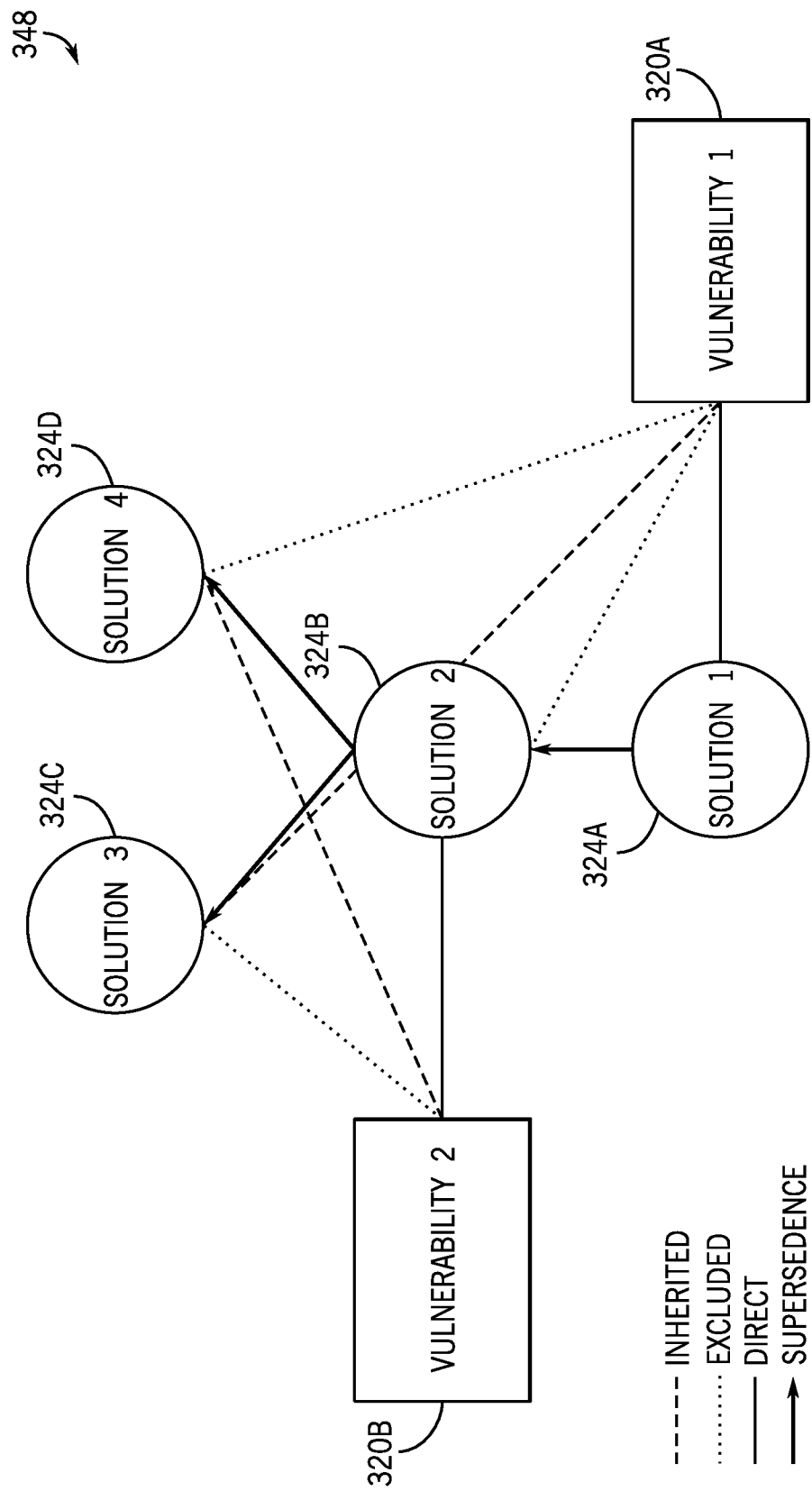

Since each vulnerability is associated with a different set of excluded solutions, the acceptable paths of the solution graph that the graph traversal module may walk can be different from the perspective of each vulnerability. For example, as illustrated in the graph 344 of FIG. 11, vulnerabilities 320A and 320B are both associated with the same supersedence chain of solutions 324. However, solution 324B is excluded for vulnerability 320A, and solutions 324B and 342C are both excluded for vulnerability 320B. In another example, as illustrated in the graph 346 of FIG. 12, solutions 324B and 324D have an excluded relationship with respect to vulnerability 320A. When the graph traversal module traverses the graph from the solution 324A directly related to the vulnerability 320A, traversal may proceed through excluded solution 324B, which reveals two new solution paths to follow. In this example, since solution 324D is also excluded, solution 324C is identified as the highest superseding solution of vulnerability 320A and is selected as the recommended solution for this vulnerability. In another example, in the graph 348 of FIG. 13, although solutions 324C and 324D appear on diverging supersedence paths of the supersedence graph, when the module traverses the graph 348 from the perspective of vulnerability 320A, solution 324C is excluded. When the module traverses the graph 348 from the perspective of vulnerability 320B, solution 324D is excluded. As such, for this example, an embodiment of the module traversing the graph 348 may identify solution 324D as the highest superseding solution for vulnerability 320A, and may identify solution 324C as the highest superseding solution for vulnerability 320B.

Additionally, in certain embodiments, the links between vulnerability and solutions can be automatically flagged and designated as excluded based on rules and mappings of data between the vulnerability and the solution. For example, in certain embodiments, the vulnerability data received and stored in the TPS Vulnerabilities table 226 for certain vulnerabilities may contain details (e.g., platform-specific details, such as software version, operating system, operating system version, etc.) regarding the detected vulnerability. Likewise, solution data received and stored in the Solutions table 230 also generally include details (e.g., solution vendor information, platform-specific details) regarding each solution. It is presently recognized that, by comparing this information and automatically flagging links between vulnerabilities and solutions as excluded when this information does not meaningfully match, the VRS system 220 can improve accuracy when identifying the recommended solution for a particular vulnerability.

However, it is also presently recognized that meaningfully matching the details of the vulnerability data and the solution data is challenging. That is, the platform-specific details received in the vulnerability data often rely on a proprietary or non-standardized convention to identify a software product or operating system and version, and this does not necessarily precisely match the solution details in the received solution data. As such, in certain embodiments, the VRS system 220 may include an automated exclusion module (e.g., routine, function) that, when executed by a processor of the VRS system 220, automatically flags links as excluded based on white listing rules and a black listing rules. In certain embodiments, the automated exclusion module may be executed upon import of vulnerability and/or solution data or executed periodically (e.g., hourly, nightly). As an example, the black listing rules may include a rule that specifies that, when a stored vulnerability includes details indicating an operating system that contains the word "LINUX" or "UNIX", and when the details of a linked solution indicate that the source of the solution is "MICROSOFT", then the link is automatically flagged as excluded. In another example, the white listing rules may include a rule that specifies that, when a when a stored vulnerability includes details indicating software that contains the phrase "MICROSOFT OFFICE" and that the operating system contains the phrase "OSX", and when the details of a linked solution includes details indicating that the solution applies to "OFFICE FOR MAC", then the link is not flagged as excluded. Any suitable number of rules may be included in the white list or the black list. For example, in certain embodiments, the automated exclusion module may first execute an ordered set of white list rules before executing an ordered set of black list rules, wherein the first matching rule wins to determine whether or not the link is flagged as excluded.

In certain embodiments, the automated exclusion may be implemented using a machine learning (ML) or artificial intelligence (AI) component (e.g., module, application). For example, a ML-based may include an artificial neural network (ANN) or another suitable ML component that is designed to be trained using exclusions that have been previously defined (e.g., manually defined using the GUI, discussed below) in order to predict whether a link between a vulnerability and a solution should be automatically flagged as excluded. By way of specific example, in certain embodiments, a ML-based automated exclusion component may be trained based on the specific details received for vulnerabilities and linked solutions, such as the platform-specific information discussed above, in combination with information regarding which existing links have been manually flagged as excluded or manually unflagged as excluded after automated exclusion by an automated exclusion module, as discussed above. After training, the ML-based automated exclusion component may be provided with a combination of vulnerability and solution details as inputs, and may respond by producing a binary exclusion output (e.g., exclude link or do not exclude link). In certain embodiments, in addition to the binary exclusion output, the ML-based automated exclusion component may generate a confidence score (e.g., a real number having a value between 0 and 1), which may be considered a measurement of how similar a given set of vulnerability and solution detail inputs are to the vulnerability and solution details inputs used during training. For such embodiments, the VRS system 220 may store a configurable confidence score threshold, and the link may only be flagged as excluded when it is indicated by the binary exclusion output, and when the confidence score is greater than the configurable confidence threshold, of the ML-based automated exclusion component.

FIGS. 14A, 14B, and 15 are simulated screenshots of an embodiment of a graphical user interface (GUI) 350 that is designed to receive user requests to exclude a relationship between a vulnerability and a solution. The portion of the GUI 350 illustrated in FIGS. 14A and 14B is designed to present information for a particular vulnerability stored in the TPS Vulnerabilities table 226. Additionally, the illustrated GUI 350 includes a Solutions tab 352 that presents a table 354 listing information for solutions stored in the Solutions table 230 that are each related to the particular vulnerability by a respective link stored in the Links table 228. Each solution listed in the table 354 of the GUI 350 includes a respective checkbox 356 or other suitable user interface element that enables the user to select one or more particular solutions that are related to the particular vulnerability. As illustrated in FIG. 15, the GUI 350 further includes a select box 358 that enables the user to request that the selected solutions be excluded for the particular vulnerability. As such, in response to receiving the request provided by the GUI 350, the VR server 222 may set the Excluded flag fields of the links between the particular vulnerability and the selected solution to true, as discussed above with respect to FIG. 7. Accordingly, when the GUI 350 illustrated in FIGS. 14 and 15 is refreshed, the solutions whose links have been excluded will no longer be presented in the table 354 of the GUI 350 as a potential solution.

Technical effects of the present disclosure include a vulnerability-solution resolution system that is designed to create and maintain relationships or associations between vulnerabilities identified by third-party scanners (TPSs) and solutions, such as software patches received from third-party vendors. The VSRS includes a data scheme that enables information regarding vulnerabilities and solutions to be stored, and enables certain relationships to be automatically created between these vulnerabilities and solutions. In particular, the VSRS is designed to automatically form certain relationships between particular vulnerabilities and solutions based on solution supersedence and inheritance. Additionally, the VSRS includes a GUI that enables a user to exclude particular relationships from consideration when recommending solutions to resolve a vulnerability or when calculating metrics regarding the vulnerability.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A vulnerability-solution resolution (VSR) system, comprising:

at least one memory comprising a vulnerabilities table configured to store vulnerabilities detected on a client network, a solutions table configured to store solutions to address the vulnerabilities, and a links table configured to store links that associate the vulnerabilities of the vulnerabilities table with the solutions of the solutions table; and
at least one processor configured to execute stored instructions to perform actions comprising:
determining a recommended solution for a vulnerability stored in the vulnerabilities table by:
determining, from the links table, a set of non-excluded links associated with the vulnerability in the vulnerabilities table and respectively associated with a set of solutions in the solutions table;
determining a solution supersedence chain of the set of solutions; and
selecting the recommended solution as a highest supersedence solution from the solution supersedence chain.

2. The VSR system of claim 1, wherein, before determining the recommended solution for the vulnerability, the at least one processor is configured to execute the stored instructions to perform actions comprising:
determining a plurality of solutions from the solution table having common vulnerabilities and exposures (CVE) identifiers that match a CVE identifier of the vulnerability; and
for each solution of the plurality of solutions, creating a respective link in the links table that associates the vulnerability in the vulnerabilities table to the solution in the solutions table.

3. The VSR system of claim 1, wherein, before determining the recommended solution for the vulnerability, the at least one processor is configured to execute the stored instructions to perform actions comprising:
receiving user input requesting that a selected link of the links table be excluded, wherein the selected link associates the vulnerability in the vulnerabilities table with a particular solution in the solutions table; and
updating the selected link in the links table to be an excluded link.

4. The VSR system of claim 3, wherein, after updating the selected link, the at least one processor is configured to execute the stored instructions to perform actions comprising:
identifying a link of the links table that associates the vulnerability in the vulnerabilities table and a superseding solution of the particular solution in the solutions table; and
updating the link in the links table to be a second excluded link.

5. The VSR system of claim 1, wherein, before determining the recommended solution for the vulnerability, the at least one processor is configured to execute the stored instructions to perform actions comprising:
comparing a vulnerability detail of the vulnerability stored in the vulnerabilities table to a solution detail of a particular solution stored in the solutions table based on a stored rule, wherein the vulnerability and the particular solution are associated by a link stored in the links table; and
in response to determining that the vulnerability detail and the solution detail do not meaningfully match when compared based on the stored rule, updating the link in the links table to be an excluded link.

6. The VSR system of claim 1, wherein the at least one memory is configured to store a trained machine learning (ML)-based automated exclusion component, and wherein, before determining the recommended solution for the vulnerability, the at least one processor is configured to execute the stored instructions to perform actions comprising:
providing the trained ML-based automated exclusion component with inputs to generate a binary exclusion output, wherein the inputs comprise vulnerability details of the vulnerability and solution details of a particular solution that is associated with the vulnerability by a link stored in the links table; and
updating the link in the links table to be an excluded link based on the binary exclusion output of the trained ML-based automated exclusion component.

7. The VSR system of claim 1, wherein the at least one memory includes a solution succession table configured to store succession relationships between solutions stored in the solution table, and wherein, to determine the solution supersedence chain of the set of solutions, the at least one processor is configured to execute the stored instructions to perform actions comprising:
selecting one or more entries of the solution succession table associated with the set of solutions; and
constructing the solution supersedence chain of the set of solutions from the selected one or more entries.

8. The VSR system of claim 7, wherein, before determining the recommended solution for the vulnerability, the at least one processor is configured to execute the stored instructions to perform actions comprising:
receiving and storing solution data in the solutions table;
determining that the stored solution data indicates that a first solution stored in the solutions table supersedes a second solution stored in the solutions table;
adding an entry to the solution succession table indicating that the first solution supersedes the second solution;
identifying a link in the links table that associates the second solution in the solutions table and a corresponding vulnerability in the vulnerabilities table; and
adding an inherited link to the links table that associates the first solution in the solutions table and the corresponding vulnerability in the vulnerabilities table.

9. The VSR system of claim 8, wherein the identified link and the inherited link each include a respective exclude flag, and wherein, to add the inherited link to the links table, the at least one processor is configured to execute the stored instructions to perform actions comprising:
setting the respective exclude flag of the inherited link to have the same value as the respective exclude flag of the identified link.

10. The VSR system of claim 8, wherein the at least one processor is configured to execute the stored instructions to perform actions comprising:
identifying a second link in the links table that associates the second solution stored in the solutions table and a second corresponding vulnerability stored in the vulnerabilities table; and
adding a second inherited link to the links table that associates the first solution in the solutions table and the second corresponding vulnerability in the vulnerabilities table.

11. A method of operating vulnerability-solution resolution (VSR) system comprising stored vulnerabilities detected on a client network, stored solutions to address the stored vulnerabilities, and stored links that associate the stored solutions and the stored vulnerabilities, the method comprising:
determining a recommended solution for a stored vulnerability by:

determining, from the stored links, a set of non-excluded links associated with the stored vulnerability and respectively associated with a set of solutions of the stored solutions;

determining a solution supersedence chain of the set of solutions; and selecting the recommended solution as a highest supersedence solution from the solution supersedence chain.

12. The method of claim 11, wherein, before determining the recommended solution for the stored vulnerability, the method comprises:

receiving user input requesting that a selected stored link be excluded, wherein the selected stored link associates the stored vulnerability and a particular stored solution; and updating the selected stored link to be an excluded link.

13. The method of claim 12, comprising:

identifying a second stored link that associates the stored vulnerability and a superseding solution of the particular stored solution; and updating the second stored link to be a second excluded link.

14. The method of claim 11, wherein, before determining the recommended solution for the stored vulnerability, the method comprises:

comparing a stored vulnerability detail of the stored vulnerability to a stored solution detail of a stored solution based on a stored rule, wherein the stored vulnerability and the stored solution are associated by a stored link; and in response to determining that the stored vulnerability detail and the stored solution detail do not meaningfully match when compared based on the stored rule, updating the stored link to be an excluded link.

15. The method of claim 11, wherein, before determining the recommended solution for the stored vulnerability, the method comprises:

providing a trained ML-based automated exclusion component with inputs to generate a binary exclusion output and a confidence score, wherein the inputs comprise stored vulnerability details of the stored vulnerability and stored solution details of a stored solution that is associated with the stored vulnerability by a stored link; and in response to determining that the confidence score is above a predetermined threshold value, updating the stored link to be an excluded link.

16. The method of claim 11, wherein each of the stored solutions includes a respective common vulnerabilities and exposures (CVE) identifier, wherein the stored vulnerability includes a CVE identifier, and wherein the stored links comprise a set of links respectively associating the stored vulnerability to each stored solution for which the respective CVE identifier of the stored solution matches the CVE identifier of the stored vulnerability.

17. The method of claim 11, wherein, before determining the recommended solution for the stored vulnerability, the method comprises:

in response to determining that a first stored solution supersedes a second stored solution and that the stored links comprise a first link that associates the second stored solution with the vulnerability:

updating the second stored solution to refer to the first stored solution as superseding; and creating and storing a second link that associates the first stored solution to the stored vulnerability, wherein the second link inherits an excluded status or a non-excluded status of the first link.

18. A non-transitory, computer-readable medium storing instructions executable by a processor of a vulnerability-solution resolution (VSR) system comprising stored vulnerabilities detected on a client network, stored solutions to address the stored vulnerabilities, and stored links that associate the stored solutions and the stored vulnerabilities, wherein the instructions comprise instructions to:

determine a recommended solution for a stored vulnerability by:

determining, from the stored links, a set of non-excluded links associated with the stored vulnerability and respectively associated with a set of solutions of the stored solutions;

determining a solution supersedence chain of the set of solutions; and selecting the recommended solution as a highest supersedence solution from the solution supersedence chain.

19. The medium of claim 18, wherein, before determining the recommended solution for the stored vulnerability, the instructions comprise instructions to:

receive user input requesting that a selected stored link be excluded, wherein the selected stored link associates the stored vulnerability and a stored solution;

update the selected stored link to be an excluded link;

identify a second stored link that associates the stored vulnerability and a superseding solution of the stored solution; and update the second stored link to be a second excluded link.

20. The medium of claim 18, wherein, before determining the recommended solution for the stored vulnerability, the instructions comprise instructions to:

provide a trained ML-based automated exclusion component with inputs to generate a binary exclusion output and a confidence score, wherein the inputs comprise stored vulnerability details of the stored vulnerability and stored solution details of a stored solution that is associated with the stored vulnerability by a stored link; and in response to determining that the confidence score is above a predetermined threshold value, updating the stored link to be an excluded link.

* * * * *